United States Patent
Yu et al.

(10) Patent No.: US 10,200,506 B2
(45) Date of Patent: Feb. 5, 2019

(54) METHOD, SYSTEM AND DEVICE FOR MONITORING DATA

(71) Applicant: TENCENT TECHNOLOGY (SHENZHEN) COMPANY LIMITED, Shenzhen (CN)

(72) Inventors: Wenfeng Yu, Shenzhen (CN); Yeshang Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 379 days.

(21) Appl. No.: 14/698,301

(22) Filed: Apr. 28, 2015

(65) Prior Publication Data

US 2015/0304457 A1  Oct. 22, 2015

Related U.S. Application Data

(63) Continuation of application No. PCT/CN2013/086100, filed on Oct. 29, 2013.

(30) Foreign Application Priority Data

Oct. 29, 2012 (CN) .......................... 2012 1 0420759

(51) Int. Cl.
G06F 15/16 (2006.01)
H04L 29/06 (2006.01)
(Continued)

(52) U.S. Cl.
CPC .......... *H04L 67/42* (2013.01); *H04L 41/5009* (2013.01); *H04L 43/10* (2013.01); *H04L 67/10* (2013.01)

(58) Field of Classification Search
CPC ..... H04L 41/5009; H04L 43/00; H04L 43/10; H04L 63/1441; H04L 67/10;
(Continued)

(56) References Cited

U.S. PATENT DOCUMENTS

2002/0198984 A1\* 12/2002 Goldstein ............. G06F 11/323
  709/224
2006/0161662 A1\* 7/2006 Ng ...................... H04L 12/2823
  709/227
(Continued)

FOREIGN PATENT DOCUMENTS

CN  101202649 A  6/2008
CN  201213268 Y  3/2009
(Continued)

OTHER PUBLICATIONS

Chinese Office Action for Application No. 2012104207596 dated Apr. 5, 2016, and an English concise explanation of relevance thereof.
(Continued)

*Primary Examiner* — Dustin Nguyen
*Assistant Examiner* — Hao Nguyen
(74) *Attorney, Agent, or Firm* — Anova Law Group, PLLC

(57) ABSTRACT

A method, system and device for monitoring data. A server receives service running data of a service transmitted from a client. The server acquires a first abnormal strategy corresponding to the service and provides an alarm for the service when the first abnormal strategy is matched according to the service running data. The server can determine for which service running on the client the abnormality occurs and an alarm is provided.

13 Claims, 14 Drawing Sheets

(51) Int. Cl.
*H04L 12/24* (2006.01)
*H04L 12/26* (2006.01)
*H04L 29/08* (2006.01)

(58) Field of Classification Search
CPC .......... H04L 12/2823; H04L 41/0631; H04L 63/1408; H04L 63/145; H04L 67/025; H04L 43/06; H04L 67/42; G06F 11/0784; G06F 11/30; G06F 11/3452
USPC ....... 709/201, 203, 223, 224, 226, 227, 248; 700/91, 108, 109, 11; 370/241, 242, 252
See application file for complete search history.

(56) References Cited

U.S. PATENT DOCUMENTS

| | | | | |
|---|---|---|---|---|
| 2006/0205488 | A1* | 9/2006 | Gagner | G07F 17/32 463/29 |
| 2009/0012650 | A1* | 1/2009 | Wang | F24F 11/30 700/276 |
| 2010/0005174 | A1* | 1/2010 | Naughton | H04M 3/42136 709/226 |
| 2010/0122345 | A1* | 5/2010 | Wu | H04L 63/145 726/24 |
| 2012/0069748 | A1* | 3/2012 | Van Den Bogaert | H04W 24/10 370/252 |

FOREIGN PATENT DOCUMENTS

| | | |
|---|---|---|
| CN | 101668301 A | 3/2010 |
| CN | 101714930 A | 5/2010 |
| CN | 101826993 A | 9/2010 |
| CN | 102547807 A | 7/2012 |
| CN | 102609346 A * | 7/2012 |
| EP | 2098970 A1 | 9/2009 |
| TW | 200921374 A | 5/2009 |

OTHER PUBLICATIONS

International Search Report for Application No. PCT/CN2013/086100 dated Jan. 30, 2014.

International Preliminary Report for Application No. PCT/CN2013/086100 dated May 14, 2015.

Taiwan Office Action for Application No. 10420466530 and an English concise explanation of relevance thereof.

* cited by examiner

METHOD, SYSTEM AND DEVICE FOR MONITORING DATA

CROSS-REFERENCE TO RELATED APPLICATIONS

This application is a continuation of International Application No. PCT/CN2013/086100, filed Oct. 29, 2013. This application claims the benefit and priority of Chinese Application No. 201210420759.6, filed Oct. 29, 2012. The entire disclosures of each of the above applications are incorporated herein by reference.

FIELD

The present disclosure relates to a method, system and device for monitoring data.

BACKGROUND

This section provides background information related to the present disclosure which is not necessarily prior art.

In a monitoring system, data running on a monitored device is collected through a data collecting process installed in a peripheral of the monitored device. More particularly, the data running on the monitored device is recorded in various ways. Afterwards, the peripheral can report the collected data to a monitoring device through a network. The data is displayed in a monitoring interface in the monitoring device.

In conventional monitoring systems, all data from the monitored device is displayed in the monitoring interface of the monitoring device and is analyzed manually to determine whether there is a problem in the monitored device. Thus, analysis of the monitored data is complex.

SUMMARY

This section provides a general summary of the disclosure, and is not a comprehensive disclosure of its full scope or all of its features.

A method, system and device for monitoring data are provided according to various embodiments to simplify analysis for monitoring data.

A method for monitoring data is provided according to various embodiments, which includes:

receiving, by a server, service running data of a service transmitted from a client;

acquiring, by the server, a first abnormal strategy corresponding to the service, wherein the first abnormal strategy comprises a first condition comprising a service parameter value wherein satisfaction of the first condition indicates that an abnormality of running the service on the client occurs;

determining, by the server, whether the first condition is satisfied according to the received service running data and the service parameter value; and providing, by the server, an alarm indicator for the service to the client when it is determined that the first condition is satisfied.

A server is provided according to various embodiments, which includes:

a processor for executing instructions stored in a memory, the instructions comprising:

a service running data receiving instruction, to receive service running data of a service transmitted from a client;

a strategy acquiring instruction, to acquire a first abnormal strategy corresponding to the service, wherein the first abnormal strategy comprises a first condition comprising a service parameter value wherein satisfaction of the first condition indicates that an abnormality of running the service on the client occurs; and an alarming instruction, to determine whether the first condition is satisfied according to the received service running data and the service parameter value, provides an alarm indicator for the service to the client when it is determined that the first condition is satisfied.

A system is provided according to various embodiments, which includes at least one client and a server:

each client, to collect service running data of a service running on the client, transmit the service running data to a server;

the server, to receive service running data of a service transmitted from the client, acquires a first abnormal strategy corresponding to the service, wherein the first abnormal strategy comprises a first condition comprising a service parameter value wherein satisfaction of the first condition indicates that an abnormality of running the service on the client occurs, determines whether the first condition is satisfied according to the received service running data and the service parameter value, provides an alarm indicator for the service to the client when it is determined that the first condition is satisfied.

A system for monitoring data is provided according to various embodiments, which includes a server and at least one client, wherein the client includes:

a service running data collecting module, to collect service running data of a service running on the client; and a service running data transmitting module, to transmit the service running data to a server;

the server includes:

a service running data receiving module, to receive service running data of a service transmitted from a client;

a strategy acquiring module, to acquire a first abnormal strategy corresponding to the service; and an alarming module, to provide an alarm for the service when the first abnormal strategy is matched according to the service running data.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In order to make examples of the present disclosure clearer, drawings for examples of the present disclosure are briefly described. The following drawings are only for partial examples of the present disclosure, but are not all possible examples. Those skilled in the art may obtain other drawings without creative labor.

Corresponding reference numerals indicate corresponding parts throughout the several views of the drawings.

DETAILED DESCRIPTION

Example embodiments will now be described more fully with reference to the accompanying drawings.

Technical solutions in accordance with various embodiments will become apparent and integrated from the following detailed description, taken in conjunction with the accompanying drawings, illustrating by way of example the principles of the present disclosure. The described examples are only partial examples of the present disclosure, but are not all examples. The present disclosure may be represented as different forms, and thus, is not limited to the described examples. According to various embodiments, those skilled in the art can obtain other examples without creative labor, which belong to the protection scope of the present disclosure.

Figure 1:
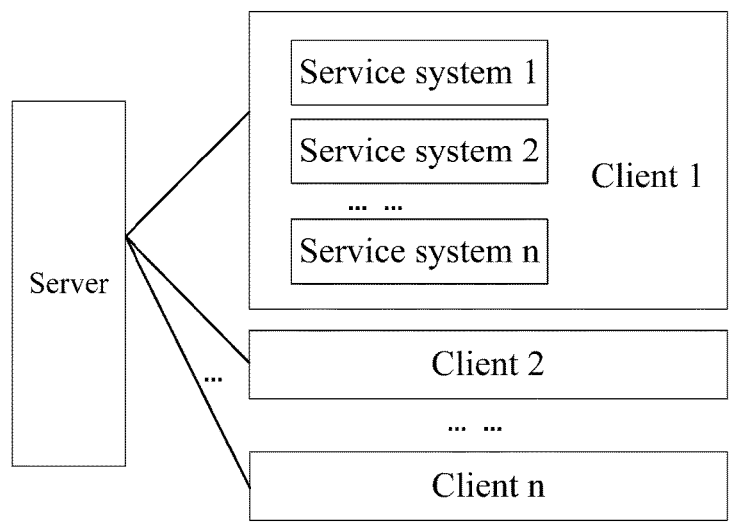
FIG. 1 is a diagram illustrating a structure of a system for monitoring data in accordance with various embodiments.

A method for monitoring data is provided according to various embodiments, which is applied to a system for monitoring data as shown in FIG. 1. The system includes at least one client and a server connected with the at least one client. The at least one client is the monitored device that can be a computing device, such as a mobile phone, a smartphone, a laptop, a tablet PC, a POS machine, and so on. In an example shown in FIG. 1, there are multiple clients. At least one service can run in a client. That is, a client can include at least one service system, such as an instant messaging service system or a service system for downloading files. In an example shown in FIG. 1, there are multiple service systems in a client. The server can monitor service running data of the at least one service running on the client.

Figure 2:
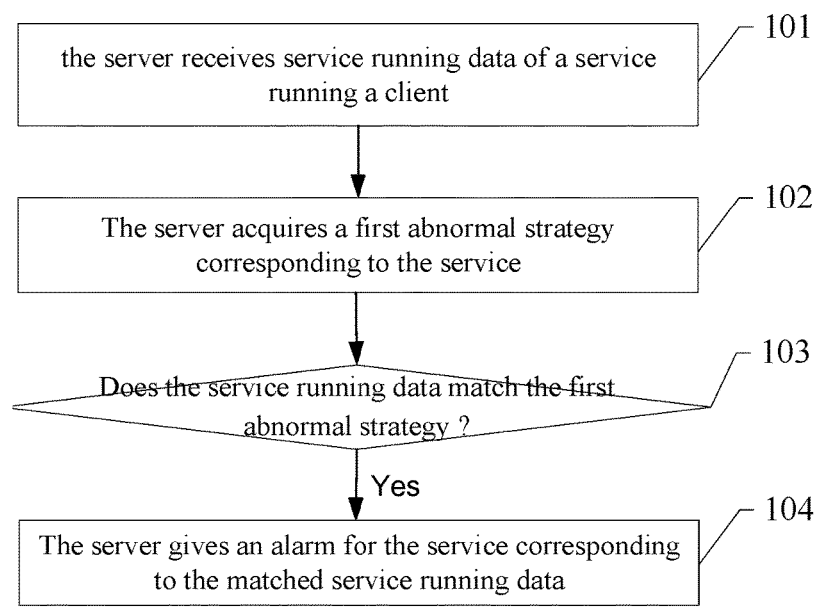
FIG. 2 is a flowchart illustrating a method for monitoring data in accordance with various embodiments.

As shown in FIG. 2, in a monitoring system, a server may monitor service running data of a service running on a client as follows.

Block 101: The server receives service running data of a service running a client, wherein the service running data of the service running on the client is transmitted from the client. The service data transmitted by the client may indicate a detail condition of running the service on the client. Specifically, the service running data may include a service identifier that uniquely identifies the service, and may also include service performance data acquired during the service's running, e.g., amount of data that is downloaded from a network and processed by a file downloading system in the client, amount of scanned data, data scanning performance, and so on.

In various embodiments, the service performance data in the service running data is collected by the client according to a preset service collection frequency. The service collection frequency may be preset in the client according to a practical requirement. For example, the client may collect the service performance data. such as data scanning performance once every 100 seconds. Service collection frequencies preset for different services in the client may be the same or different from each other. The client may collect the service performance data of different services respectively according to different service collection frequencies.

Block 102: The server acquires a first abnormal strategy corresponding to the service. The first abnormal strategy includes a condition that includes a service parameter value when an abnormality of running the service on the client occurs, e.g., the amount of service data is larger than the service parameter value. When the abnormality of running the service on the client occurs, the condition is satisfied.

The server can store the first abnormal strategy corresponding to the service. Specifically, a corresponding relation between the service identifier and the first abnormal strategy is stored. For example, for an instant messaging service running on the client, the first abnormal strategy may be that a task requirement speed is lower than or equal to zero. When acquiring the first abnormal strategy corresponding to the service, the server may search corresponding relations stored in the server according to the service running data reported by the client for the corresponding relation, including the service identifier of the service to acquire the first abnormal strategy corresponding to the service.

Block 103: The server determines whether the service running data received at block 101 matches the first abnormal strategy of the service corresponding to the service running data acquired at block 102, i.e., determines whether the service running data satisfies the condition included in the first abnormal strategy. If the service running data matches the first abnormal strategy, the service running data indicates that an abnormality occurs when the service runs on the client, and block 104 is performed. If the service running data does not match the first abnormal strategy, the server may not provide an alarm.

Block 104: The server provides an alarm for the service corresponding to the matched service running data, e.g., buzzing or popping-up a user interface to provide the alarm through the user interface. In various embodiments, the server provides an alarm indicator for the service to the client.

It can be seen from the above that in the method for monitoring data according to various embodiments, a server in a system for monitoring data may receive service running data of at least one service, and acquires a first abnormal strategy corresponding to each service. If service running data of a service matches a first abnormal strategy of the service corresponding to the service running data, the server provides an alarm for the service corresponding to the service running data. As the method for monitoring data is based on the service running on the client, the server can determine for which service running on the client the abnormality occurs and an alarm is provided. Thus, the user does not need to determine a failure of the service running on the client by manually analyzing data that corresponds to all services running on the client and displays on an interface of the monitoring system, so as to simplify data analysis.

Figure 3:
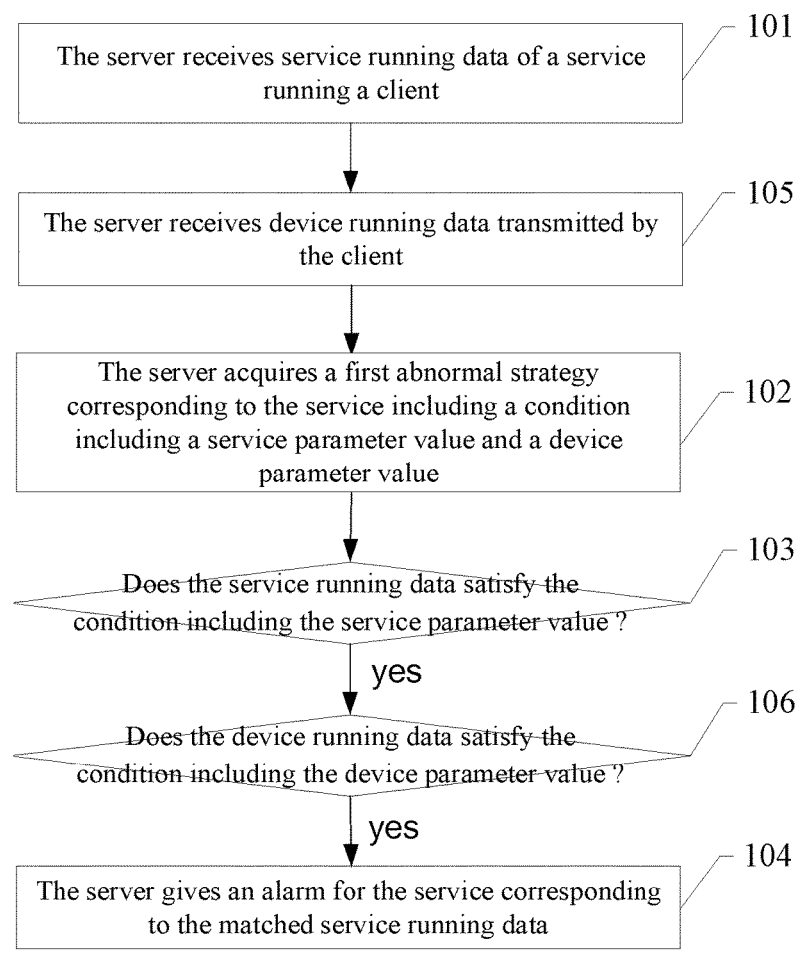
FIG. 3 is a flowchart illustrating another method for monitoring data in accordance with various embodiments.

In various embodiments, the server may not only monitor data corresponding to the service running on the client according to blocks 101-103, but may also monitor data based on a device, i.e. a client. Thus, the first abnormal strategy acquired at block 102 may not only include the condition including the service parameter value when an abnormality of running the service on the client occurs, e.g., amount of downloaded data is larger than or equal to a preset downloading amount, but may also include a condition including a device parameter value of the client, i.e., a hardware parameter value of the client, such as CPU occupancy rate, and on the like. The device parameter value may not indicate that abnormality of hardware in the client occurs. When an abnormality of running the service on the client occurs, both the condition including the service parameter value and the condition including the device parameter value are satisfied. As shown in FIG. 3, not only blocks 101-104 but also block 105 is performed in the server. Moreover, at block 103, it is determined whether the service running data matches the first abnormal strategy, i.e., the service running data satisfies the condition including the service parameter value in the first abnormal strategy. If the service running data matches the first abnormal strategy, block 106 is performed.

Block 105: The server receives the device running data transmitted from the client, wherein the device running data refers to running data of the hardware in the device i.e., the client, e.g., data related with a CPU, a memory, a network device, and a disk. The client may collect not only service running data of each service running on the client, but also the device running data of the client. The client may collect the device running data according to a preset device collection frequency. The device collection frequencies preset in various clients in the data monitoring system may be the same or different from each other. For one client, the preset device collection frequency and the preset service collection frequency may be also the same or different from each other.

Block 106: The server determines whether the device running data received at block 105 matches the first abnormal strategy, i.e., determining whether the received device running data satisfies the condition including a device parameter value of the client in the first abnormal strategy. If the device running data matches the first abnormal strategy, the server provides an alarm for the service corresponding to the service running data matched at block 104. If the device running data does not match the first abnormal strategy, the server does not provide an alarm. That is, if both the device running data of the client and the service running data corresponding to the service match the first abnormal strategy, the server provides an alarm for the service. Thus, when providing an alarm for the service, the server may consider factors of both the service running on the client and the client. The server provides an alarm only when both the machine running data and the service running data respectively satisfy corresponding conditions in the first abnormal strategies.

It should be noted that there is no required order between block 105 and blocks 101-103. There is also no required order between block 106 and block 103. Block 105 and blocks 101-103 can be performed at the same time or in order. Also, Block 106 and block 103 can be performed at the same time or in order. The method as shown in FIG. 3 is only a concrete implementation method.

Figure 4:
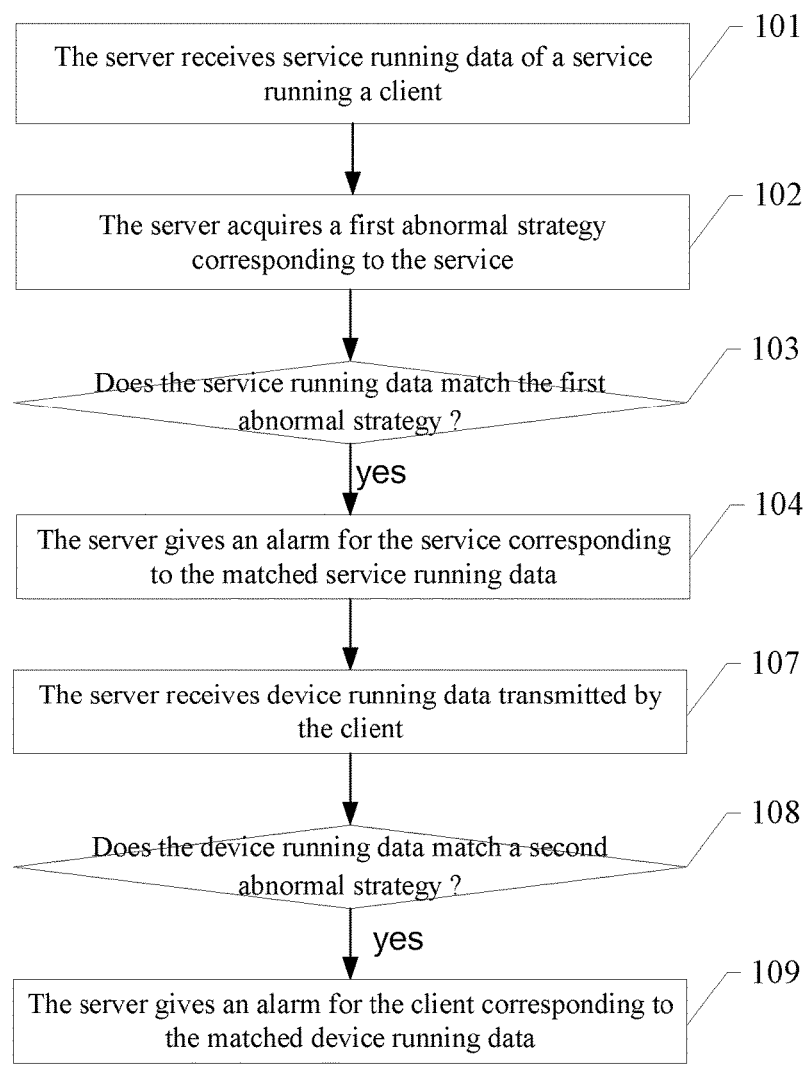
FIG. 4 is a flowchart illustrating another method for monitoring data in accordance with various embodiments.

In various embodiments, the server may not only monitor service running data of the service running on the client and provide an alarm for the service according to blocks 101-103, but may also monitor data of the device and provide an alarm for the device i.e., the client. As shown in FIG. 4, the server can perform not only blocks 101-104, but also blocks 107-109.

Block 107: The server receives the device running data transmitted from at least one client, wherein the device running data refers to running data of the hardware in the client, e.g., data related with a CPU, a memory, a network device, and a disk. The client may collect not only service running data of each service running on the client, but also the device running data of the client. The client may collect the device running data according to a preset device collection frequency. The device collection frequencies preset in various clients in the data monitoring system may be the same or different from each other. For one client, the preset device collection frequency and the preset service collection frequency may be also the same or different from each other.

Block 108: The server determines whether the device running data received in block 107 matches a second abnormal strategy. The second abnormal strategy may include the device parameter value when an abnormality occurs in the client, e.g., the CPU occupancy rate value and the temperature value. When the abnormality of the client on the client occurs, the condition including the device parameter value is satisfied. More particularly, the server determines whether the device running data received in block 107 satisfies a condition including a device parameter value in the second abnormal strategy. If the device running data matches the second abnormal strategy, block 109 is performed. If the device running data does not match the second abnormal strategy, the server may not provide an alarm. Second abnormal strategies for various clients may be the same or different from each other.

Block 109: The server provides an alarm for the client corresponding to the matched device running data.

It should be noted that in the example, the server may manage the monitored client. More particularly, the server may store a list of monitored clients. A network address (i.e. IP) and a client state (including abnormal or normal) may be stored in the list for each monitored client. A state of a service running on each monitored client may also be stored in the list, which includes an abnormal state or a normal state.

There is no required order between blocks 107-109 and blocks 101-103 that can be performed at the same time or in order. FIG. 4 illustrates an exemplary implementation method. The first abnormal strategy and the second abnormal strategy indicate different abnormal strategies, but do not indicate order relationship of abnormal strategies.

It should be noted that, both the first abnormal strategy corresponding to the service acquired at block 102 and the second abnormal strategy corresponding to the client acquired at block 108 may be preset in the server by a user according to requirements. For the first abnormal strategy, the server may acquire first configuration information of the first abnormal strategy corresponding to the service and reconfigure the first abnormal strategy corresponding to the service stored in the server according to the acquired first configuration information. For the second abnormal strategy, the server may acquire second configuration information of the second abnormal strategy corresponding to the client and reconfigure the second abnormal strategy according to the acquired second configuration information. The first configuration information and the second configuration information may be stored in a script. The server may receive the first configuration information and second configuration information input by other devices, or input by the user from a user interface.

According to the various embodiments from block 101 to block 109, the server can provide an alarm for the abnormal service running on the client, and can also provide an alarm for the client in which the abnormality of the hardware occurs. In various embodiments, after providing an alarm for the abnormal service, i.e., after block 104 is performed, the server may acquire a recovering command for the service corresponding to the matched service running data, and transmit the recovering command to the client reporting the service running data. The recovering command carries a recovering operation indication to direct the client to perform a recovering operation, such as restarting a service system. The recovering command may be acquired according to the abnormal service. For example, for the abnormal service in a network downloading service system, the service may generate the recovering command to indicate that the client restarts the network downloading service system.

After providing an alarm for the abnormal client, i.e., after block 109 is performed, the server may acquire a recovering command for the client corresponding to the matched device running data, and transmit the recovering command to the client corresponding to the device running data. The recovering command carries a recovering operation indication to direct the client to perform a recovering operation, such as restarting the client. The recovering command may be acquired according to the specific client. For example, if the abnormality occurs in client 1, the service may generate the recovering command to indicate restarting the client 1. Thus, through interaction between the client and the server, the abnormal client or the client corresponding to the abnormal service is adjusted properly, to make the client recovered to a normal state.

Figure 5:
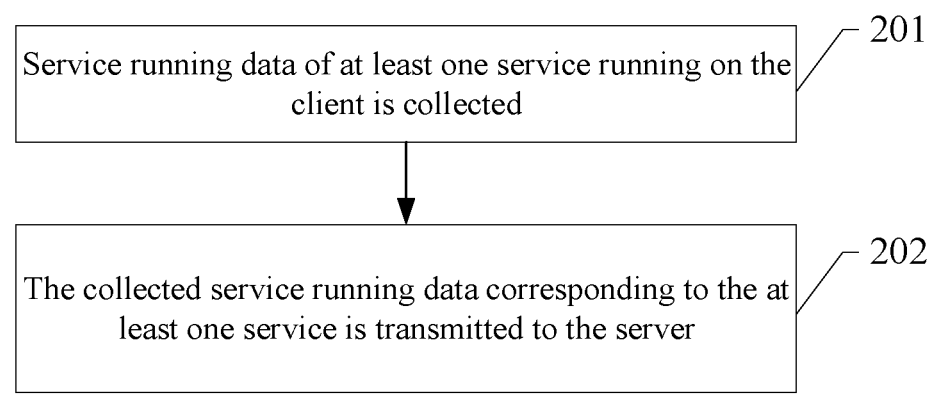
FIG. 5 is a flowchart illustrating another method for monitoring data in accordance with various embodiments.

A method for monitoring data is provided according to various embodiments, which applies to a system for monitoring data as shown in FIG. 1. As shown in FIG. 5, the method includes procedures as follows.

Block 201: Service running data of at least one service running on the client is collected. At least one service runs on the client. The service running data of a service can indicate a specific condition of running the service. Specifically, the service running data may include a service identifier that identifies the service uniquely and the performance data acquired during a process of running the service, e.g., the amount of data that is downloaded from a network and processed by a file downloading system in the client, the amount of scanned data, and the scanning performance.

In various embodiments, the service performance data in the service running data is collected by the client according to a preset service collection frequency. The service collection frequency may be preset in the client according to practical requirement. For example, the client may collect the service performance data, such as data scanning performance once every 100 seconds. Service collection frequencies preset for different services by the client may be same or different. The client may collect the service performance data of different services according to different service collection frequencies.

Block 202: The collected service running data corresponding to the at least one service is transmitted to the server, so that when the service running data matches a first abnormal strategy of the service corresponding to the service running data, the server provides an alarm for the service corresponding to the matched service running data. The method for monitoring data performed by the server is shown as FIG. 2, which is not described repeatedly herein.

It can be seen from the above that in a method for monitoring data according to various embodiments, in a system for monitoring data, a client collects service running data corresponding to at least one service, transmit the collected service running data to the server so that when the service running data matches a first abnormal strategy of the service corresponding to the service running data, the server provides an alarm for the service corresponding to the matched service running data. As the method for monitoring data is based on the service running on the client, the server can determine for which service running on the client the abnormality occurs to provide an alarm. Thus, the user does not need to determine a failure of the service running on the client by manually analyzing data that corresponds to all services running on the client and displays on an interface of a monitoring system, so as to simplify data analysis.

According to block 201 and block 202, the client collects the service running data and transmits the service running data to the server, wherein the data monitoring is based on the service. In various embodiments, the client not only performs blocks 201 and 202, but also monitors data based on a device. Specifically, the client may collect device running data, i.e., a hardware parameter of the client, such as CPU occupancy rate, and on the like. The collected device running data is transmitted to the server. Thus, when the server determines that the device running data matches a second abnormal strategy, the server provides an alarm for the client corresponding to the matched device running data. Optionally, the server may provide an alarm for the abnormal service according to a method for monitoring data as shown in FIG. 3.

The client may collect the device running data according to a preset device collection frequency. Device collection frequencies preset in various clients in the system for monitoring data may be same or different. For one client, the preset device collection frequency and the preset service collection frequency may be the same or different.

In various embodiments, the client may not only perform above blocks 201 and 202, but may also receive a recovering command transmitted by the server. The recovering command is acquired by the server according to the service corresponding to the service running data matching the first abnormal strategy or the client corresponding to the machine running data matching the second abnormal strategy. For example, if the abnormality in a network downloading service system occurs, the server may generate the recovering command to indicate that the client restarts the network downloading service system. If the abnormality occurs in client 1, the service may generate the recovering command to indicate restarting the client 1. Thus, through interaction between the client and the server, the abnormal client or the client corresponding to the abnormal service is adjusted properly to make the client recover to a normal state. Communication between the client and the server may be based on User Datagram Protocol (UDP), and on the like.

Figure 6:
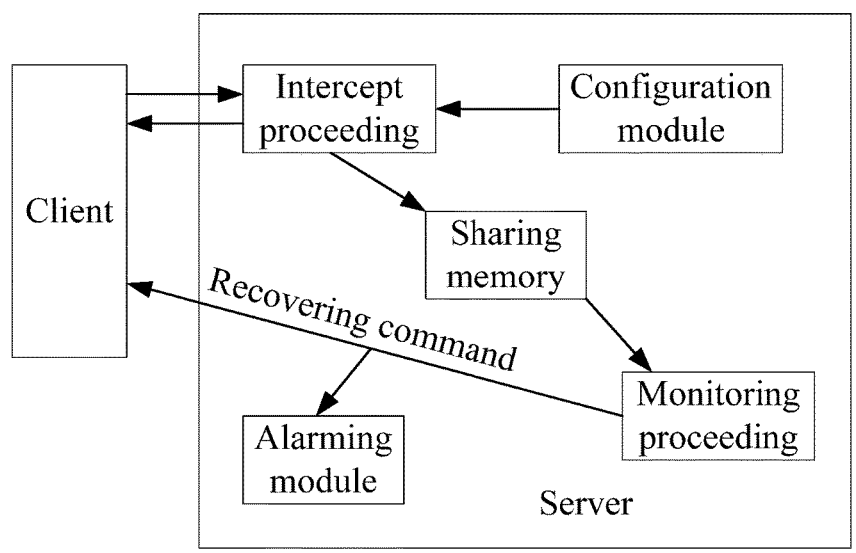
FIG. 6 is a diagram illustrating a structure of a server in accordance with various embodiments.

A method for monitoring data according to various embodiments is as shown in FIG. 6, which applies to a system for monitoring data as shown in FIG. 1. In the example, the server may include an intercepting proceeding, a monitoring proceeding, a sharing memory, an alarming module, and a configuring module.

The intercepting proceeding in the server may intercept service running data and device running data reported by a client and store the service running data and the device running data in the shared memory. The intercepting proceeding may further feed a response back to the data reported by the client. The intercepting proceeding may further intercept a first abnormal strategy and a second abnormal strategy, configured by the configuring module, and store the first abnormal strategy and the second abnormal strategy into the shared memory.

The service running data and the device running data of the client may be as shown in FIG. 1. In FIG. 1, CPU overload, HANDLE, and memory are included in the device running data. Other data is included in the service running data.

A format of a string is that the string that does not end with zero begins with a uint16_t to represent the number of characters in the string, and the string follows the uint16_t. "char" represents integer data. For data of a sample scanned unsuccessfully, a unique identity code of the sample md5 is added on basis of a scanning result. For data of a sample scanned over a period of time, the unique identity code of the sample md5 and a scanning time (in seconds) are added on basis of the scanning result. "ucDataCmd" is a primary command, which indicates the type of command to be performed. "ucDataSubcmd" is a secondary command, which indicates a sub-command in the types of commands.

| Data Name | ucDataCmd | ucDataSubcmd | Data Format |
|---|---|---|---|
| Amount of task requests | 0x01 | 0x01 | uint32_t |
| Downloading amount | 0x01 | 0x02 | uint32_t |
| Scanning amount | 0x01 | 0x03 | uint32_t |
| Amount of sentenced black | 0x01 | 0x04 | uint32_t |
| Amount of scanning failures | 0x01 | 0x05 | uint32_t |
| Amount of downloading failures | 0x01 | 0x06 | uint32_t |
| Speed of requesting tasks | 0x01 | 0x07 | uint32_t |
| Scanning speed | 0x01 | 0x08 | uint32_t |
| Downloading speed | 0x01 | 0x09 | uint32_t |
| Size of a task queue | 0x01 | 0x0a | uint32_t |
| Size of a downloading queue | 0x01 | 0x0b | uint32_t |
| The number of certificates | 0x01 | 0x64 | uint32_t |
| Framework version | 0x02 | 0x01 | string |
| Engine Version | 0x02 | 0x02 | string |
| Virus database version | 0x02 | 0x03 | string |
| CPU load | 0x03 | 0x01 | uint32_t |
| Memory | 0x03 | 0x02 | uint32_t |
| HANDLE | 0x03 | 0x03 | uint32_t |
| Sample scanned unsuccessful | 0x04 | 0x01 | uint8_t + char[32] |
| Sample scanned in a long time | 0x05 | 0x01 | uint8_t + char[32] + uint64_t |
| Amount of task requests | 0x01 | 0x01 | uint32_t |
| Downloading amount | 0x01 | 0x02 | uint32_t |
| Scanning amount | 0x01 | 0x03 | uint32_t |
| Amount of sentenced black | 0x01 | 0x04 | uint32_t |
| Amount of scanning failures | 0x01 | 0x05 | uint32_t |
| Amount of downloading failures | 0x01 | 0x06 | uint32_t |
| Speed of requesting tasks | 0x01 | 0x07 | uint32_t |
| Scanning speed | 0x01 | 0x08 | uint32_t |
| Downloading speed | 0x01 | 0x09 | uint32_t |
| Size of a task queue | 0x01 | 0x0a | uint32_t |
| Size of a downloading queue | 0x01 | 0x0b | uint32_t |
| The number of certificates | 0x01 | 0x64 | uint32_t |
| Framework version | 0x02 | 0x01 | string |
| Engine Version | 0x02 | 0x02 | string |
| Virus database version | 0x02 | 0x03 | string |
| CPU load | 0x03 | 0x01 | uint32_t |
| Memory | 0x03 | 0x02 | uint32_t |
| HANDLE | 0x03 | 0x03 | uint32_t |
| Sample scanned unsuccessful | 0x04 | 0x01 | uint8_t + char[32] |
| Sample scanned over a period of time | 0x05 | 0x01 | uint8_t + char[32] + uint64_t |

The intercepting proceeding in the server may intercept the service running data and the device running data reported by the client and may store the service running data and the device running data into the sharing memory. Thus, the monitoring proceeding may read the service running data and the device running data from the sharing memory, read the first abnormal strategy and the second abnormal strategy from the sharing memory, and monitor data according to the processes as shown in FIG. 2 and FIG. 4, which is not described repeatedly herein.

If the service corresponding to the service running data is to be alarmed, the monitoring proceeding may control the alarming module to provide an alarm for the service and transmit a recovering command corresponding to the service to the client. If the client corresponding to the device running data is to be alarmed, the monitoring proceeding may control the alarming module to provide an alarm for the client and transmit a recovering command corresponding to the client to the client.

Figure 7:
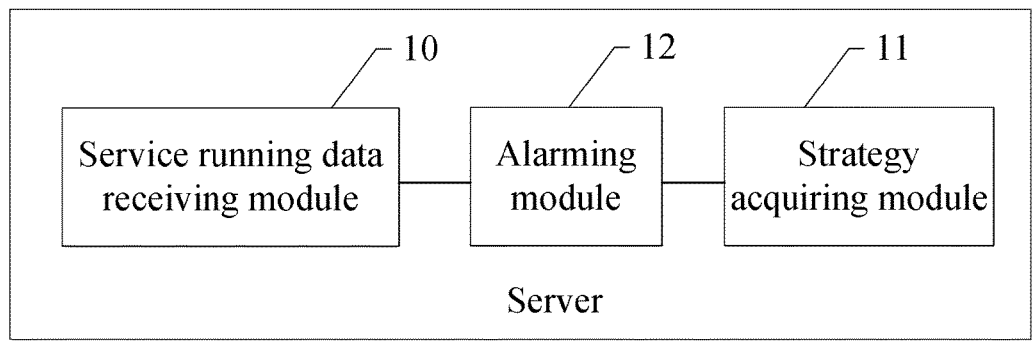
FIG. 7 is a diagram illustrating another structure of a server in accordance with various embodiments.

A server is provided according to various embodiments. FIG. 7 is a diagram illustrating a structure of a server according to various embodiments. The server includes:

a service running data receiving module 10, to receive service running data of a service transmitted from a client, wherein at least one service runs on the client;

a strategy acquiring module 11, to acquire a first abnormal strategy corresponding to the service; and an alarming module 12, to determine whether the first condition is satisfied according to the received service running data and the service parameter value, provide an alarm for the service when the service running data received by the service running data receiving module 10 matches the first abnormal strategy acquired by the strategy acquiring module 11. In various embodiments, the server provides an alarm indicator for the service to the client.

In various embodiments, the service running data receiving module 10 may receive service running data of a service transmitted from a client. The strategy acquiring module 11 may acquire a first abnormal strategy corresponding to the service. The alarming module 12 may determine whether the first condition is satisfied according to the received service running data and the service parameter value and provide an alarm for the service when the service running data received by the service running data receiving module 10 matches the first abnormal strategy acquired by the strategy acquiring module 11. As the method for monitoring data is based on the service running on the client, the server can determine for which service running on the client the abnormality occurs and an alarm is provided. Thus, the user does not need to determine a failure of the service running on the client by manually analyzing data that corresponds to all services running on the client and displays on an interface of the monitoring system, so as to simplify data analysis.

Figure 8:
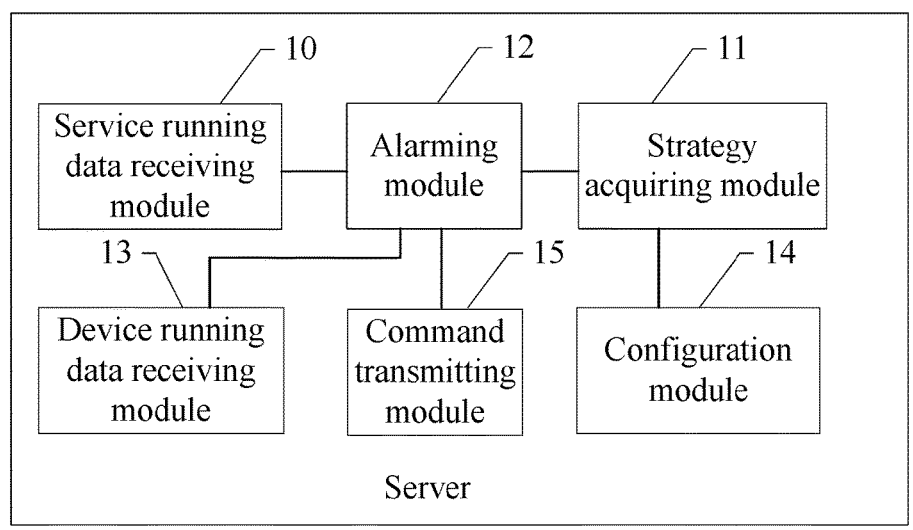
FIG. 8 is a diagram illustrating another structure of a server in accordance with various embodiments.

As shown in FIG. 8, in various embodiments, the server not only includes the service running data receiving module 10, the strategy acquiring module 11, and the alarming module 12, but also includes a device running data receiving module 13, a configuration module 14, and a command transmitting module 15:

the device running data receiving module 13, to receive device running data of the client transmitted by the client;

the configuration module 14, to acquire first configuration information corresponding to the service, reconfigure the first abnormal strategy according to the first configuration information;

the configuration module 14, further to acquire second configuration information corresponding to the service, reconfigure a second abnormal strategy according to the second configuration information; and the command transmitting module 15, to transmit a recovering command to the client, wherein the recovering command carries a recovering operation indication to direct the client to perform a recovering operation indicated by the recovering operation indication.

In various embodiments, the configuration module 14 may configure the first abnormal strategy and/or the second abnormal strategy stored in the server. The strategy acquiring module 11 may acquire the first abnormal strategy after the first abnormal strategy is configured by the configuration module 14. When the first abnormal strategy acquired by the strategy acquiring module 11 includes a condition including a service parameter value and a condition including a device parameter value, the alarming module 12 may determine whether the second condition is satisfied according to the received device running data and the device parameter value to consider both the service running on the client and the hardware of the client to provide an alarm for the service. More particularly, when the service running data satisfies the condition including the service parameter value and the device running data satisfies the condition including the device parameter value, the alarming module 12 may provide an alarm for the service. The process of providing an alarm for the service is the same as that in an example corresponding to FIG. 3. In various embodiments, when the device running data received by the device running data receiving module 13 matches the second abnormal strategy, the alarming module 12 may provide an alarm for the client corresponding to the client. The process of providing an alarm for the client is the same as that in an example corresponding to FIG. 4.

After the alarming module 12 provides an alarm, the command transmitting module 15 may acquire the recovering command according to the service or the client, and transmit the recovering command to the client, wherein the recovering command carries a recovering operation indication to direct the client to perform a recovering operation indicated by the recovering command indication. For example, when the alarming module 12 provides an alarm for the service in a network downloading service system, the command transmitting module 15 may generate the recovering command that directs the client to restart the network downloading service system. When the alarming 12 provides an alarming for client 1, the command transmitting module 12 may generate a recovering command indicating restarting the client 1.

It should be noted that, in various embodiments, a server may further include a monitoring management module to manage the monitored client. In detail, the monitoring management module may store a list of monitored clients. A network address (i.e. IP) and a client state (including abnormal or normal) may be stored in the list for each monitored client. A state of a service running on each monitored client may also be stored in the list, which includes an abnormal state or a normal state.

Figure 9:
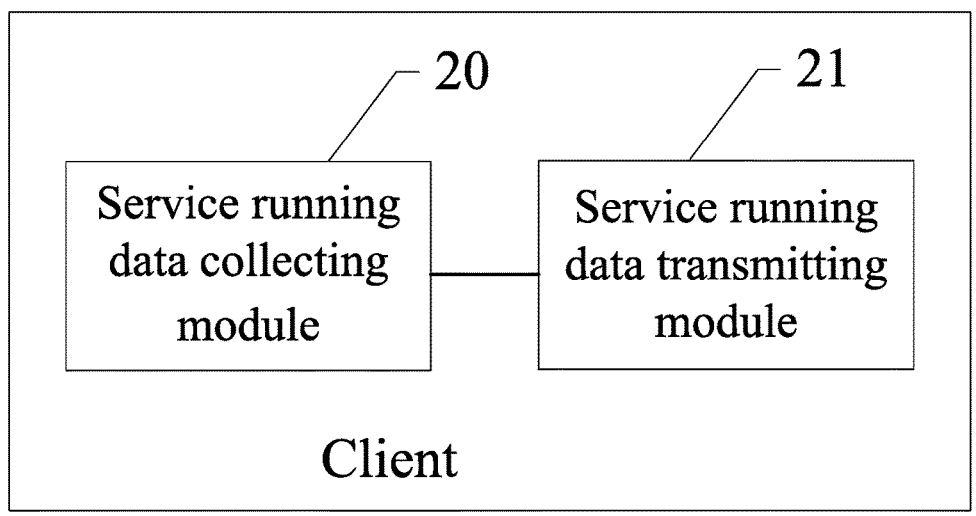
FIG. 9 is a diagram illustrating a structure of a client in accordance with various embodiments.

A client is provided according to various embodiments. As shown in FIG. 9, the client includes a service running data collecting module 20 and a service running data transmitting module 21. The service running data collecting module 20 collects service running data of a service running on the client. The service running data collecting module 20 collects the service running data of the service according to a service collection frequency preset in the client. Service collection frequencies preset in the client for different services may be same or different. The service running data transmitting module 21 transmits the service running data collected by the service running data collecting module 20 to a server, so that the server provides an alarm for a service corresponding to the service running data when the server determines that the service running data matches a first abnormal strategy.

In various embodiments of the client, the service running data collecting module 20 collects service running data of a service running on the client. The service running data transmitting module 21 transmits the service running data to a server, so that the server provides an alarm for the service corresponding to the service running data when the server determines that the service running data matches the first abnormal strategy. As the method for monitoring data is based on the service running on the client, the server can determine for which service running on the client the abnormality occurs and an alarm is provided. Thus, the user does not need to determine a failure of the service running on the client by manually analyzing data that corresponds to all services running on the client and displays on an interface of the monitoring system, so as to simplify data analysis.

Figure 10:
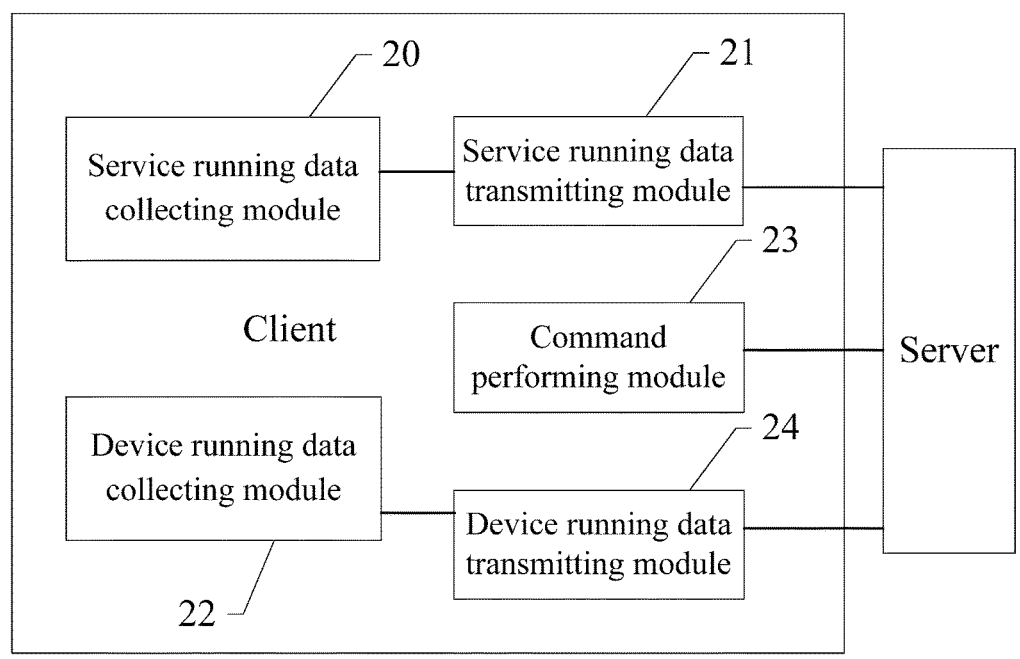
FIG. 10 is a diagram illustrating another structure of a client in accordance with various embodiments.

As shown in FIG. 10, in various embodiments, the client not only includes a service running data collecting module 20 and a service running data transmitting module 21 as shown in FIG. 9, but also includes a device running data collecting module 22, a device running data transmitting module 23, and a command performing module 24. The device running data collecting module 22 collects device running data of the client. The device running data collecting module 22 collects the device running data of the client according to a device collection frequency preset in the client. Device collection frequencies preset in different clients may be the same or different. The device running data transmitting module 23 transmits the device running data collected by the device running data collecting module 22 to the server, so that the server provides an alarm for the client corresponding to the device running data when the server determines that the device running data matches a second abnormal strategy. The command performing module 24 receives a recovering command corresponding to the service transmitted from the server, wherein the recovering command carries a recovering operation indication and performs a recovering operation indicated by the recovering operation indication.

A system for monitoring system is provided according to various embodiments. As shown in FIG. 1, the system includes a server and at least one client, wherein each client includes at least one service system and a service that runs on a service system. The client collects service running data of a service running on the client and transmits the service running data to a server. The server receives service running data of a service transmitted from a client, acquire a first abnormal strategy corresponding to the service, and provide an alarm for the service when the service running data matches the first abnormal strategy. The server further acquires a recovering command according to the alarmed service, transmit the recovering command to the client to direct the client to adjust the service, e.g., restarting a service system. The client in the example is as shown in FIG. 9 or FIG. 10. The server in the example is as shown in any of FIG. 6-FIG. 8, which is not described repeatedly herein.

Figure 11:
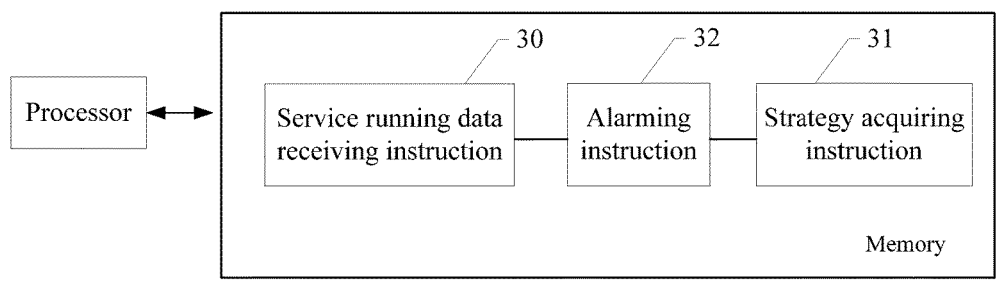
FIG. 11 is a diagram illustrating another structure of a server in accordance with various embodiments.

A server is provided according to various embodiments. FIG. 11 is a diagram illustrating a structure of a server according to various embodiments. The computer device includes a processor for executing instructions stored in a memory. The instructions include a service running data receiving instruction 30, a strategy acquiring instruction 31, and an alarming instruction 32. The service running data receiving instruction 30 receives service running data of a service transmitted from a client, wherein at least one service runs on the client. The strategy acquiring instruction 31 acquires a first abnormal strategy corresponding to the service. The alarming instruction 32 determines whether the first condition is satisfied according to the received service running data and the service parameter value and provide an alarm for the service when the service running data received by the service running data receiving instruction 30 matches the first abnormal strategy acquired by the strategy acquiring instruction 31. In various embodiments, the server provides an alarm indicator for the service to the client.

In various embodiments, the service running data receiving instruction 30 may receive service running data of a service transmitted from a client. The strategy acquiring instruction 31 may acquire a first abnormal strategy corresponding to the service. The alarming instruction 32 may determine whether the first condition is satisfied according to the received service running data and the service parameter value and provide an alarm for the service when the service running data received by the service running data receiving instruction 30 matches the first abnormal strategy acquired by the strategy acquiring instruction 31. As the method for monitoring data is based on the service running on the client, the server can determine for which service running on the client the abnormality occurs and an alarm is provided. Thus, the user does not need to determine a failure of the service running on the client by manually analyzing data that corresponds to all services running on the client and displays on an interface of the monitoring system, so as to simplify data analysis.

Figure 12:
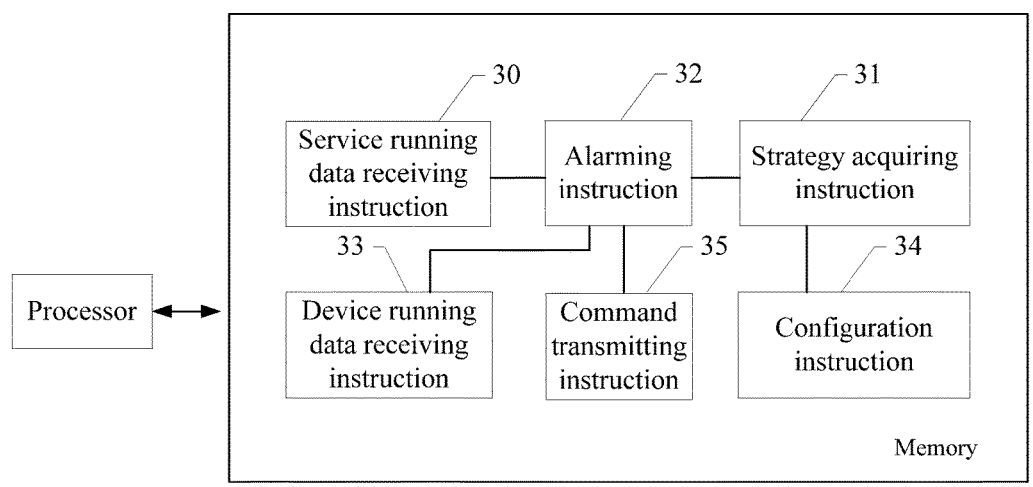
FIG. 12 is a diagram illustrating another structure of a server in accordance with various embodiments.

As shown in FIG. 12, in various embodiments, the instructions not only include the service running data receiving instruction 30, the strategy acquiring instruction 31, and the alarming instruction 32, but also include a device running data receiving instruction 33, a configuration instruction 34, and a command transmitting instruction 35. The device running data receiving instruction 33 receives device running data of the client transmitted by the client. The configuration instruction 34 acquires first configuration information corresponding to the service and reconfigures the first abnormal strategy according to the first configuration information. The configuration instruction 34 further acquires second configuration information corresponding to the service and reconfigure a second abnormal strategy according to the second configuration information. The command transmitting instruction 35 transmits a recovering command to the client, wherein the recovering command carries a recovering operation indication to indicate the client to perform a recovering operation indicated by the recovering operation indication.

In various embodiments, the configuration instruction 34 may be to configure the first abnormal strategy and/or the second abnormal strategy. The strategy acquiring instruction 31 may be to acquire the first abnormal strategy after the first abnormal strategy is configured by the configuration instruction 34. When the first abnormal strategy acquired by the strategy acquiring instruction 31 includes a condition including a service parameter value and a condition including a device parameter value, the alarming instruction 32 may be to determine whether the second condition is satisfied according to the received device running data and the device parameter value to consider both the service running on the client and the hardware of the client to provide an alarm for the service. More particularly, when the service running data satisfies the condition including the service parameter value and the device running data satisfies the condition including the device parameter value, the alarming instruction 32 may be to provide an alarm for the service. The process of providing an alarm for the service is the same as that in an example corresponding to FIG. 3. In various embodiments, when the device running data received by the device running data receiving instruction 33 may be to match the second abnormal strategy, the alarming instruction 32 may be to provide an alarm for the client corresponding to the client. The process of providing an alarm for the client is the same as that in an example corresponding to FIG. 4.

The command transmitting instruction 35 may be to acquire the recovering command according to the service or the client, and transmit the recovering command to the client, wherein the recovering command carries a recovering operation indication to direct the client to perform a recovering operation indicated by the recovering command indication. For example, the command transmitting instruction 35 may generate the recovering command that directs the client to restart the network downloading service system. The command transmitting instruction 32 may generate a recovering command indicating restarting the client 1.

It should be noted that, in various embodiments a server may further include a monitoring management instruction that is to manage the monitored client. In particular, the monitoring management instruction may store a list of monitored clients. A network address (i.e. IP) and a client state (including abnormal or normal) may be stored in the list for each monitored client. A state of a service running on each monitored client may also be stored in the list, which includes an abnormal state or a normal state.

Figure 13:
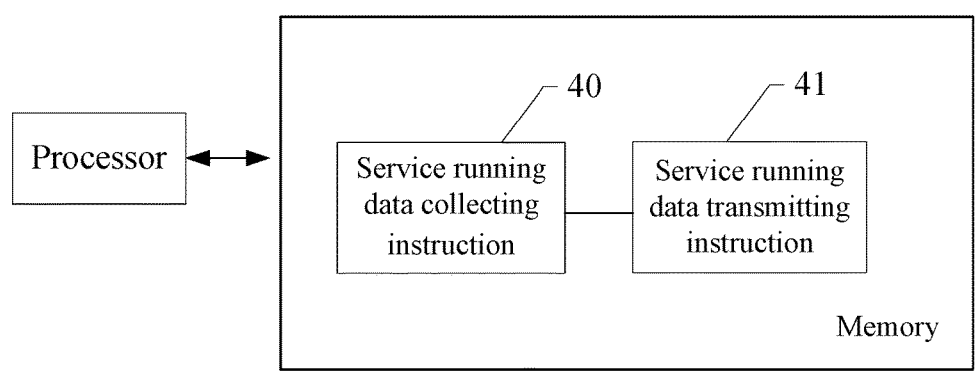
FIG. 13 is a diagram illustrating another structure of a client in accordance with various embodiments.

A client is provided according to various embodiments. As shown in FIG. 13, the client includes a processor for executing instructions stored in a memory. The instructions include a service running data collecting instruction 40 and a service running data transmitting instruction 41. The service running data collecting instruction 40 collects service running data of a service running on the client. The service running data collecting instruction 40 collects the service running data of the service according to a service collection frequency preset in the client. Service collection frequencies preset in the client for different services may be same or different. The service running data transmitting instruction 41 transmits the service running data collected by the service running data collecting instruction 40 to a server, so that the server provides an alarm for a service corresponding to the service running data when the server determines that the service running data matches a first abnormal strategy.

In various embodiments of the client, the service running data collecting instruction 40 collects service running data of a service running on the client. The service running data transmitting instruction 41 transmits the service running data to a server, so that the server provides an alarm for the service corresponding to the service running data when the server determines that the service running data matches the first abnormal strategy. As the method for monitoring data is based on the service running on the client, the server can determine for which service running on the client the abnormality occurs and an alarm is provided. Thus, the user does not need to determine a failure of the service running on the client by manually analyzing data that corresponds to all services running on the client and displays on an interface of the monitoring system, so as to simplify data analysis.

Figure 14:
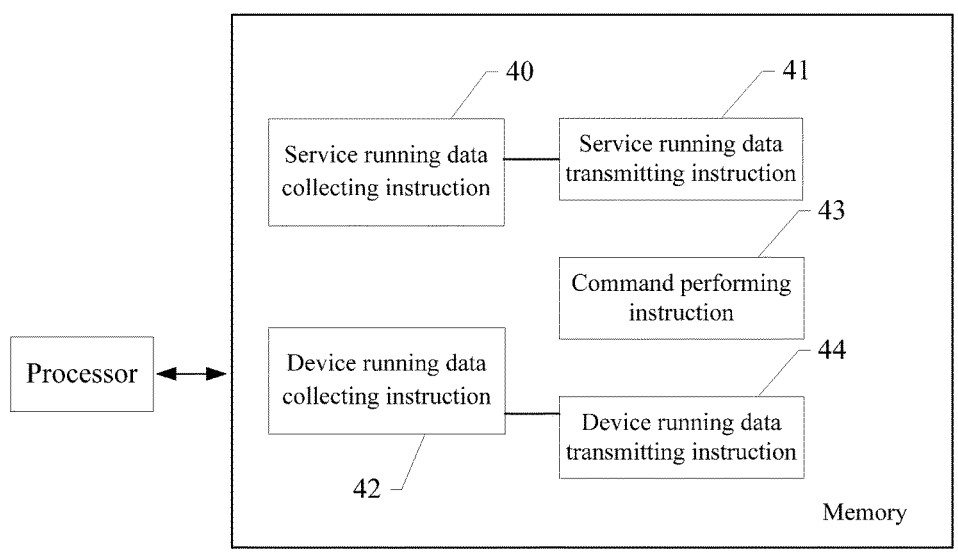
FIG. 14 is a diagram illustrating another structure of a client in accordance with various embodiments.

As shown in FIG. 14, in various embodiments, the instructions not only include a service running data collecting instruction 40 and a service running data transmitting instruction 41 as shown in FIG. 13, but also include a device running data collecting instruction 42, a device running data transmitting instruction 43, and a command performing instruction 44.

The device running data collecting instruction 42 collects device running data of the client. The device running data collecting instruction 42 collects the device running data of the client according to a device collection frequency preset in the client. Device collection frequencies preset in different clients may be same or different. The device running data transmitting instruction 43 transmits the device running data collected by the device running data collecting instruction 42. The command performing instruction 44 receives a recovering command corresponding to the service transmitted from the server, wherein the recovering command carries a recovering operation indication and performs a recovering operation indicated by the recovering operation indication.

Those skilled in the art know that all or part of the blocks in the above examples can be implemented through a processor for executing instructions stored in a memory. The instructions can be stored in a readable storage medium, such as Read-only memory (ROM), Random Access Memory (RAM), Magnetic, Optical Disk, and so on.

The described embodiments are only partial embodiments of the present invention and are not all embodiments. The present invention may be represented as different forms, and thus, is not limited to the described embodiments. According to the various embodiments those skilled in the art can obtain other embodiments without creative labor, which belong to the protection scope of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for monitoring data, comprising:
receiving, by a server, service running data of a service transmitted from a client, wherein the service running data of the service includes a service identifier that identifies the service uniquely and performance data acquired during running a process of the service, and the service is at least one of an instant messaging service or a file transmission service executed on the client;
receiving, by the server, device running data of the client, wherein the device running data refers to running data of hardware of the client, and the hardware of the client includes at least a processor and a memory;
acquiring, by the server, a first abnormal strategy corresponding to the service, wherein the first abnormal strategy is preset in the server by a user according to requirements, and the first abnormal strategy includes a first condition including a service parameter value wherein satisfaction of the first condition indicates that an abnormality of running the service on the client occurs;
determining, by the server, whether the first condition is satisfied according to the received service running data and the service parameter value;
determining, by the server, whether a second condition comprised in a second abnormal strategy corresponding to the client is satisfied according to the received device running data and a device parameter value included in the second condition, wherein satisfaction of the second condition indicates that an abnormality of the client occurs; and
providing, by the server, an alarm indicator to the client including a first recovering command carrying a recovering operation indication to restart the process of the service executed on the client when determine the first condition is satisfied, and a second recovering command carrying a recovering operation indication to restart the client when determine the second condition is satisfied;
wherein the method further comprises:
acquiring, by the server, first configuration information corresponding to the service, the first configuration information being inputted by the user; and
reconfiguring, by the server, the first abnormal strategy according to the first configuration information.

2. The method according to claim 1, further comprising:
acquiring, by the server, second configuration information corresponding to the service; and
reconfiguring, by the server, the second abnormal strategy according to the second configuration information.

3. The method according to claim 1, further comprising:
transmitting, by the server, to the client a recovering command carrying a recovering operation indication.

4. A server, comprising:
a processor and a memory, the memory storing instructions, and the instructions, when executed by the processor, causing the processor to:
receive service running data of a service transmitted from a client, wherein the service running data of the service includes a service identifier that identifies the service uniquely and performance data acquired during a process of running the service, and the service is at least one of an instant messaging service or a file transmission service executed on the client;
receive, by the server, device running data of the client, wherein the device running data refers to running data of hardware of the client, and the hardware of the client includes at least a processor and a memory;
acquire a first abnormal strategy corresponding to the service, wherein the first abnormal strategy is preset in the server by a user according to requirements, and the first abnormal strategy includes a first condition including a service parameter value wherein satisfaction of the first condition indicates that an abnormality of running the service on the client occurs; and
determine whether the first condition is satisfied according to the received service running data and the service parameter value;
determine, by the server, whether a second condition comprised in a second abnormal strategy corresponding to the client is satisfied according to the received device running data and a device parameter value included in the second condition, wherein satisfaction of the second condition indicates that an abnormality of the client occurs; and provide, by the server, an alarm indicator to the client including a first recovering command carrying a recovering operation indication to restart the process of the service executed on the client when determine the first condition is satisfied, and a second recovering command carrying a recovering operation indication to restart the client when determine the second condition is satisfied;

wherein the instructions, when executed by the processor, further cause the processor to:

acquire first configuration information corresponding to the service, the first configuration information being inputted by the user; and reconfigure the first abnormal strategy according to the first configuration information.

5. The server according to claim 4, wherein the instructions, when executed by the processor, further cause the processor to:

acquire second configuration information corresponding to the service, reconfigure the second abnormal strategy according to the second configuration information.

6. The server according to claim 4, wherein the instructions, when executed by the processor, further cause the processor to:

transmit to the client a recovering command carrying a recovering operation indication.

7. A system for monitoring data, comprising at least one client and a server, wherein the client comprises a first processor and a first memory, and the server comprises a second processor and a second memory, the client is configured to collect service running data of a service running on the client and to transmit the service running data to a server, wherein the service running data of the service comprises a service identifier that identifies the service uniquely and performance data acquired during a process of running the service, and the service is at least one of an instant messaging service or a file transmission service executed on the client;

the server is configured to:

receive the service running data of the service transmitted from the client, receiving device running data of the client, wherein the device running data refers to running data of hardware of the client, and the hardware of the client includes at least a processor and a memory, acquire a first abnormal strategy corresponding to the service, wherein the first abnormal strategy is preset in the server by a user according to requirements, and the first abnormal strategy includes a first condition including a service parameter value wherein satisfaction of the first condition indicates that an abnormality of running the service on the client occurs, determine whether the first condition is satisfied according to the received service running data and the service parameter value, determine whether a second condition comprised in a second abnormal strategy corresponding to the client is satisfied according to the received device running data and a device parameter value included in the second condition, wherein satisfaction of the second condition indicates that an abnormality of the client occurs, and provide an alarm indicator to the client including a first recovering command carrying a recovering operation indication to restart the process of the service executed on the client when determine the first condition is satisfied, and a second recovering command carrying a recovering operation indication to restart the client when determine the second condition is satisfied, wherein the server is further configured to:

acquire first configuration information corresponding to the service, the first configuration information being inputted by the user; and reconfigure the first abnormal strategy according to the first configuration information.

8. The system according to claim 7, wherein the client is further configured to collect device running data of the client, transmit the device running data to the server.

9. The method according to claim 1, wherein:

the second abnormal strategy is preset in the server by the user according to requirements.

10. The method according to claim 2, wherein:

the second configuration information is received by the server based on input by other devices or input by the user from a user interface.

11. The method according to claim 1, wherein:

the service running data of the service is transmitted from the client based on User Datagram Protocol (UDP); and the alarm indicator for the service is provided by the server to the client based on UDP.

12. The method according to claim 1, wherein:

the performance data acquired during running the process of the service includes at least one of: amount of data that is downloaded from a network and processed by a file downloading system in the client, amount of scanned data, or data scanning performance.

13. The method according to claim 1, wherein the performance data includes:

a scanning result of a data sample, a scanning time of the data sample, and a unique identity code of the data sample when the data sample is scanned successfully on the client; and a scanning result of the data sample and the unique identity code of the data sample when the data sample is scanned unsuccessfully on the client.

* * * * *